UNITED STATES PATENT OFFICE.

JOHN A. JUST, OF SYRACUSE, NEW YORK.

ACID-PROOF COMPOSITION.

SPECIFICATION forming part of Letters Patent No. 520,600, dated May 29, 1894.

Application filed November 24, 1890. Serial No. 372,477. (No specimens.)

*To all whom it may concern:*

Be it known that I, JOHN A. JUST, of Syracuse, in the county of Onondaga, in the State of New York, have invented new and useful Improvements in Acid-Proof Compositions, of which the following is a full, clear, and exact description.

My invention relates to an acid proof composition particularly applicable for lining acid storing and transporting receptacles, especially those designed for hydrochloric or sulphuric chamber acids and other acid liquids; and it consists of a mixture of oil, resins and sulphur; the oil used, being linseed and the resins, guttapercha, rosin, shellac, and asphaltum or pitch. These ingredients are compounded in the following proportion by weight, viz: linseed oil three hundred and seventy-eight; guttapercha one hundred and sixty; rosin two hundred and eighty; shellac two hundred and forty; asphaltum or pitch three hundred and twenty, and sulphur one hundred and twenty-seven and one-half parts. The aforesaid proportion is calculated to produce the best composition suitable for all purposes, but I have ascertained that this proportion may be somewhat varied from, and still produce an acid proof mixture. It is also apparent that the equivalents of the various ingredients may be used, as for instance, rubber instead of guttapercha in which case thirty to thirty-two parts are required instead of the described amount of guttapercha; and that the said ingredients may vary somewhat in their quality, as for instance the asphaltum or pitch may be either Egyptian, Greek, or American, although the Greek effects the best results. My preferable manner of mixing these ingredients consists in heating the linseed oil and then sulphurizing it by agitation with about one per cent. of sulphur; adding the guttapercha to the hot sulphurized linseed oil; and, after these parts become a homogeneous mass, adding the rosin, asphaltum or pitch and shellac; meanwhile keeping up the heat until the whole mass is uniformly and thinly fluid. The sulphur is then added in small or divisional quantities, and the temperature of the mixture constantly increased, since after careful experience I have demonstrated the fact that this method of mixing the sulphur is necessary in order to maintain the fluid consistency of the compound, as if the required amount is added as a whole the entire mass suddenly congeals and becomes unfit and impracticable for the purposes desired. After the entire amount of sulphur has been added, as described, the compound is still agitated until thinly fluid, whereupon it is suitable for application to a transporting or storing receptacle as may be desired.

This composition is preferably applied on the inside of the vessels, which are preferably heated, being inserted thereinto in its heated fluid condition; after which, motion is preferably communicated to the vessel by rolling the same in various directions in order that the composition may encounter all parts of the inner surface. This motion is continued until the entire surface of the article to be lined is covered after which the surplus is poured off and the vessel again agitated or rolled until the hardening of the composition, which takes place very quickly. During the rolling of the receptacle which is preferably closed, a certain degree of pressure is generated, which thoroughly forces the compound into its pores.

I have discovered by practical experience that a vessel coated with this improved composition, as described, is particularly applicable for containing hydrochloric, sulphuric chamber acids or acid liquids, since the composition is readily applied, and is absolutely impervious even when constantly used for a long time.

It is well known that at present hydrochloric acid is transported either in glass carboys or chemical earthen ware, both of which are extremely fragile and expensive. For the purpose of safety they are covered with outer casings; but even under the most careful handling, the carboy becomes broken, the acid lost and everything with which it comes in contact destroyed, rendering their use hazardous and dangerous. On the contrary my improved composition, when applied to the interior of a vessel composed of wood or other material ordinarily pervious to hydrochloric acid, penetrates its pores and forms an impervious coating having sufficient elasticity to adhere to said material under severe shocks, and thus obviate escape of the acid under conditions which would destroy glass or chemical earthen ware carboys.

I am aware that pitch of various grades and character has been used for coating vessels, but I am not aware that vessels so coated are impervious to hydrochloric or sulphuric chamber acid or acid liquids; neither am I aware that oil and resins have been compounded with sulphur, as herein specified, for producing an acid proof composition suitable for lining acid containing reservoirs, and rendering the same capable of transporting acids.

I am also aware that a coating for metal surfaces and tarpaulins has been formed by the mixture of ten to fifteen parts of sulphur; thirty to forty parts of oil; five to ten parts of resin, and fifty-five to thirty-five parts of ozorcerite; but I am not aware that this composition is impervious to hydrochloric or sulphuric chamber acid or acid liquids; neither do I wish to herein claim such a composition.

Having thus fully described my invention, what I claim as new, and desire to secure by Letters Patent, is—

1. The herein described acid proof composition, the same being composed of linseed oil, guttapercha, sulphur, rosin, shellac, and asphaltum or pitch, the combined weight of the first three elements being less than that of the last three, substantially as set forth.

2. The herein described acid proof composition, the same being composed of linseed oil, guttapercha, sulphur, rosin, shellac, and asphaltum or pitch, the same being compounded in substantially the proportions specified, substantially as set forth.

In testimony whereof I have hereunto signed my name, in the presence of two attesting witnesses, at Syracuse, in the county of Onondaga, in the State of New York, this 21st day of November, 1890.

JOHN A. JUST.

Witnesses:
CLARK H. NORTON,
E. A. WEISBURG.